United States Patent
Williams

(10) Patent No.: US 8,547,106 B2
(45) Date of Patent: Oct. 1, 2013

(54) METHODS AND SYSTEMS INVOLVING MONITORING CIRCUIT CONNECTIVITY

(75) Inventor: Craig Benjamin Williams, Louisville, KY (US)

(73) Assignee: General Electric Company, Schenectady, NY (US)

( * ) Notice: Subject to any disclaimer, the term of this patent is extended or adjusted under 35 U.S.C. 154(b) by 401 days.

(21) Appl. No.: 12/981,653

(22) Filed: Dec. 30, 2010

(65) Prior Publication Data

US 2012/0169348 A1 Jul. 5, 2012

(51) Int. Cl.
*G01R 31/00* (2006.01)

(52) U.S. Cl.
USPC .......................................... 324/537; 324/424

(58) Field of Classification Search
USPC .......................... 324/418–424, 537; 361/139
See application file for complete search history.

(56) References Cited

U.S. PATENT DOCUMENTS

| | | | |
|---|---|---|---|
| 4,589,052 A * | 5/1986 | Dougherty | 361/94 |
| 6,456,947 B1 | 9/2002 | Adamiak et al. | |
| 7,068,045 B2 | 6/2006 | Zuercher et al. | |
| 7,345,863 B2 | 3/2008 | Fischer | |

FOREIGN PATENT DOCUMENTS

| | | |
|---|---|---|
| EP | 0785610 A2 | 7/1997 |
| EP | 0933859 A1 | 8/1999 |
| FR | 2812761 A1 | 2/2002 |

OTHER PUBLICATIONS

Search Report and Written Opinion from corresponding EP Application No. 11194816.2, May 25, 2012.

* cited by examiner

*Primary Examiner* — Vincent Q Nguyen
(74) *Attorney, Agent, or Firm* — Cantor Colburn LLP

(57) ABSTRACT

A circuit protection system includes a processor, a current sensing device having a first node and a second node, a current sensing circuit connected to the first node and the second node, the current sensing circuit operative to output a voltage indicative of a current sensed by the current sensing device to the processor, and a connection verification portion connected to the first node, the second node, and the processor, the connection verification portion operative to induce a current through the current sensing device.

11 Claims, 4 Drawing Sheets

METHODS AND SYSTEMS INVOLVING MONITORING CIRCUIT CONNECTIVITY

BACKGROUND OF THE INVENTION

The subject matter disclosed herein relates to monitoring circuit connectivity.

Circuit breakers and other electric devices often include circuits that measure current in the devices. For example, current transformers or Rogowski coils may be connected to a circuit and logic processor to monitor the current in a device.

The components in the current measuring circuits may become disconnected by, for example, improper installation or wear over the lifetime of the electric device resulting in false current measurements or a loss of current measurements in the device.

BRIEF DESCRIPTION OF THE INVENTION

According to one aspect of the invention, a circuit protection system includes a processor, a current sensing device having a first node and a second node, a current sensing circuit connected to the first node and the second node, the current sensing circuit operative to output a voltage indicative of a current sensed by the current sensing device to the processor, and a connection verification portion connected to the first node, the second node, and the processor, the connection verification portion operative to induce a current through the current sensing device.

According to another aspect of the invention, a method for operating a circuit protection system includes sending a test signal through a current sensing device, determining whether the test signal was received, and outputting an indication to a user responsive to determining that the test signal was not received.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
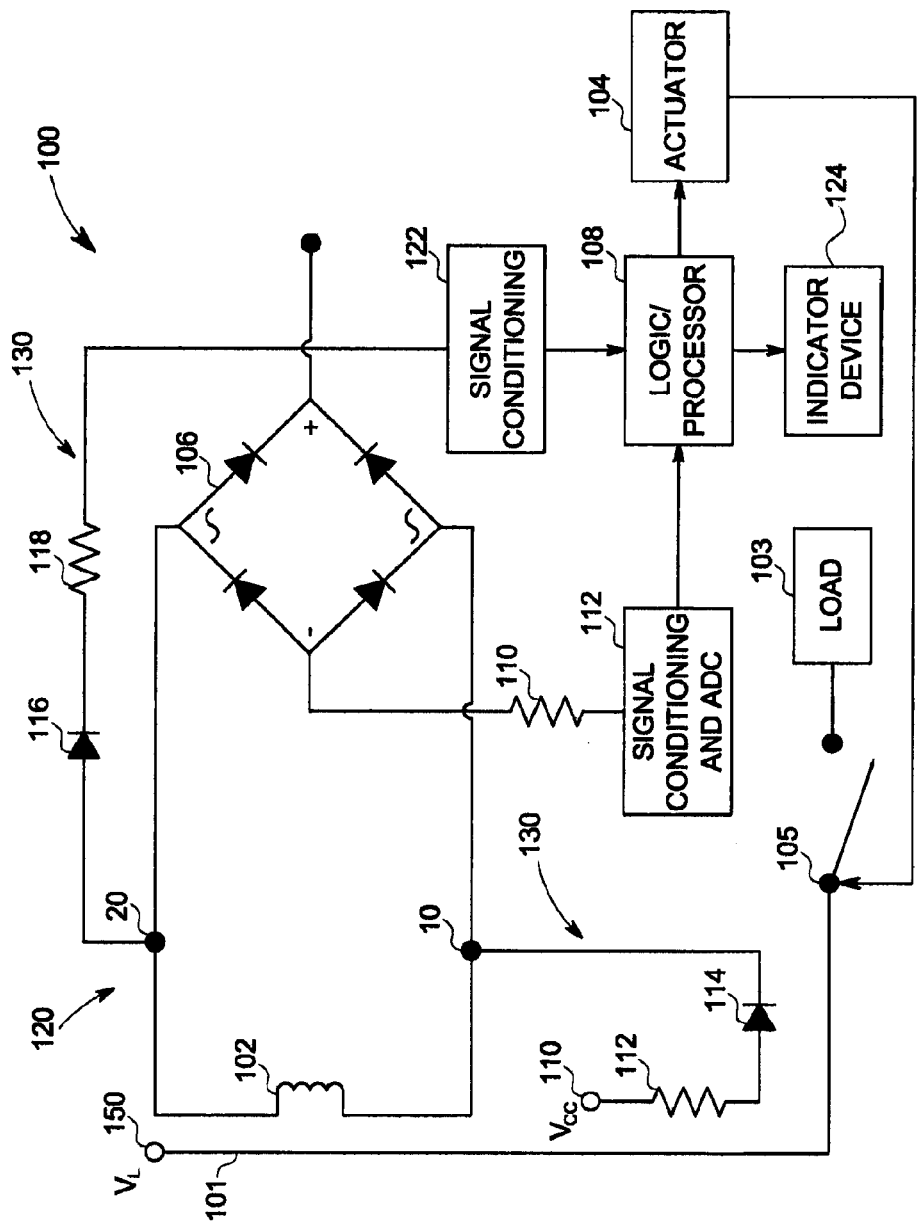
FIG. 1 illustrates a circuit diagram of a circuit protection system.

FIG. 1 illustrates a circuit diagram of an exemplary embodiment of a circuit protection system 100. The system 100 includes a sensing device 102 that may include for example, a current transformer, a voltage transformer, or a Rogowski coil device that is operative to sense current in a proximate line or current path. The sensing device 102 is disposed proximate to a line 101 that receives voltage from a voltage source ($V_L$) 150 and is connected to a load 103. In the illustrated embodiment, a switching device 105 is disposed between the $V_L$ 150 and the load 103. The switching device may be operated by an actuator 104 that is operative to open the switching device 105. The system 100 includes a current sensing portion 120 that includes the sensing device 102 that is connected to nodes 10 and 20 and a bridge rectifier portion 106 that is connected to the nodes 10 and 20. The bridge rectifier portion is connected to a logic portion or processor device 108 via a resistor 110 and signal conditioning and analog to digital converter portion (ADC) 112. The logic or processor portion (processor) 108 may include for example, a digital or analog circuit with level detection and filtering portions or integrated circuit processor capable of performing logic functions. The signal conditioning may include, for example, an arrangement of filters, capacitors, and logical integrating circuits that output a signal indicative of a measured current in the line 101 and sensed by the sensing device 102. The conditioned analog signal is converted to a digital signal by the ADC 112 and output to the processor 108. In operation, the processor 108 monitors the sensed current in the line 101 and may use logic to open the switching device 105 if, for example, the sensed current exceeds a threshold value. It is desirable to ensure that the sensing device 102 is properly connected to the processor 108 (via the bridge rectifier portion 106) during operation.

In this regard, the system 100 includes a connection verification portion (CVP) 130. The CVP 130 includes a voltage source (Vcc) 110 connected to the node 10 via a resistor 112 and a diode 114; and a diode 116 and resistor 118 connected to the processor 108 via a signal conditioning portion 122. The signal conditioning portion 122 includes filters to reduce noise and condition a signal for receipt by the processor 108. In operation, current from the Vcc 110 follows a flow path that flows through node 10, the sensing device 102, the node 20, and the signal conditioning portion 122 to the processor 108. The processor 108 may logically determine that the sensing device 102 is connected to the nodes 10 and 20 by receiving a voltage indicative of a connected flow path of the CVP 130. If the processor 108 determines that the sensing device 102 is not connected to the nodes 10 and 20, the processor may in some embodiments, open the switching device 105. The processor 108 may output an indication of the lack of connection via an indicator device 124. The indicator device may include for example, a textual indicator on a display, a non-textual visual indicator on a display, a visual indicator such as a light, or a non-visual indicator such as an audible tone or alarm.

Figure 2:
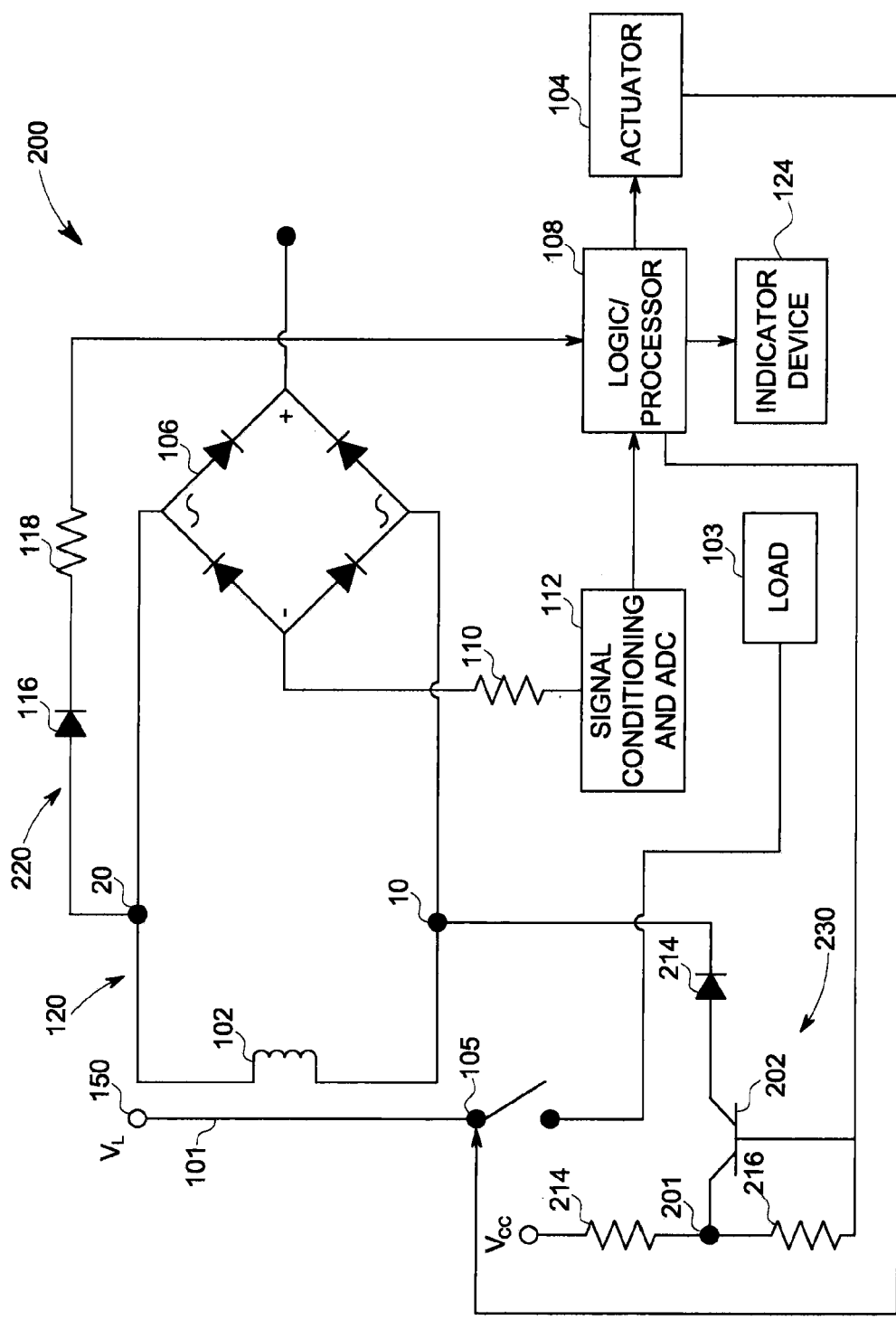
FIG. 2 illustrates an alternate exemplary embodiment of a circuit protection system.

FIG. 2 illustrates an alternate exemplary embodiment of a circuit protection system 200. The system 200 is similar to the system 100 described above, and includes, for example, the sensing device 102 that is disposed proximate to the line 101; the current sensing portion 120; and the processor 108. The connection verification portion (CVP) 230 includes the voltage source (Vcc) 110 and a switching device 202 that may include for example, a field effect transistor arranged with a source terminal connected to a node 201, a drain terminal connected to the node 10 via a diode 214, and a gate terminal connected to the processor 108. Alternatively, the switching device 202 may include an electrical/mechanical relay device or other type of switching device that is operative to be switched open and closed by the processor 108. Resistors 212 and 216 are arranged in the CVP 230 and connected to the node 202. In operation, the switching device 202 is controlled by the processor 108. The closure or activation of the switching device 202 allows the voltage from the voltage source 110 to be controlled and cycled on. Thus, the processor 108 may control the signal that flows through the flow path defined by the node 10, the sensing device 102 and the node 20. The signal may include, for example, a constant voltage, a pulse, or a square wave however; alternate embodiments may include any type of signal.

Figure 3:
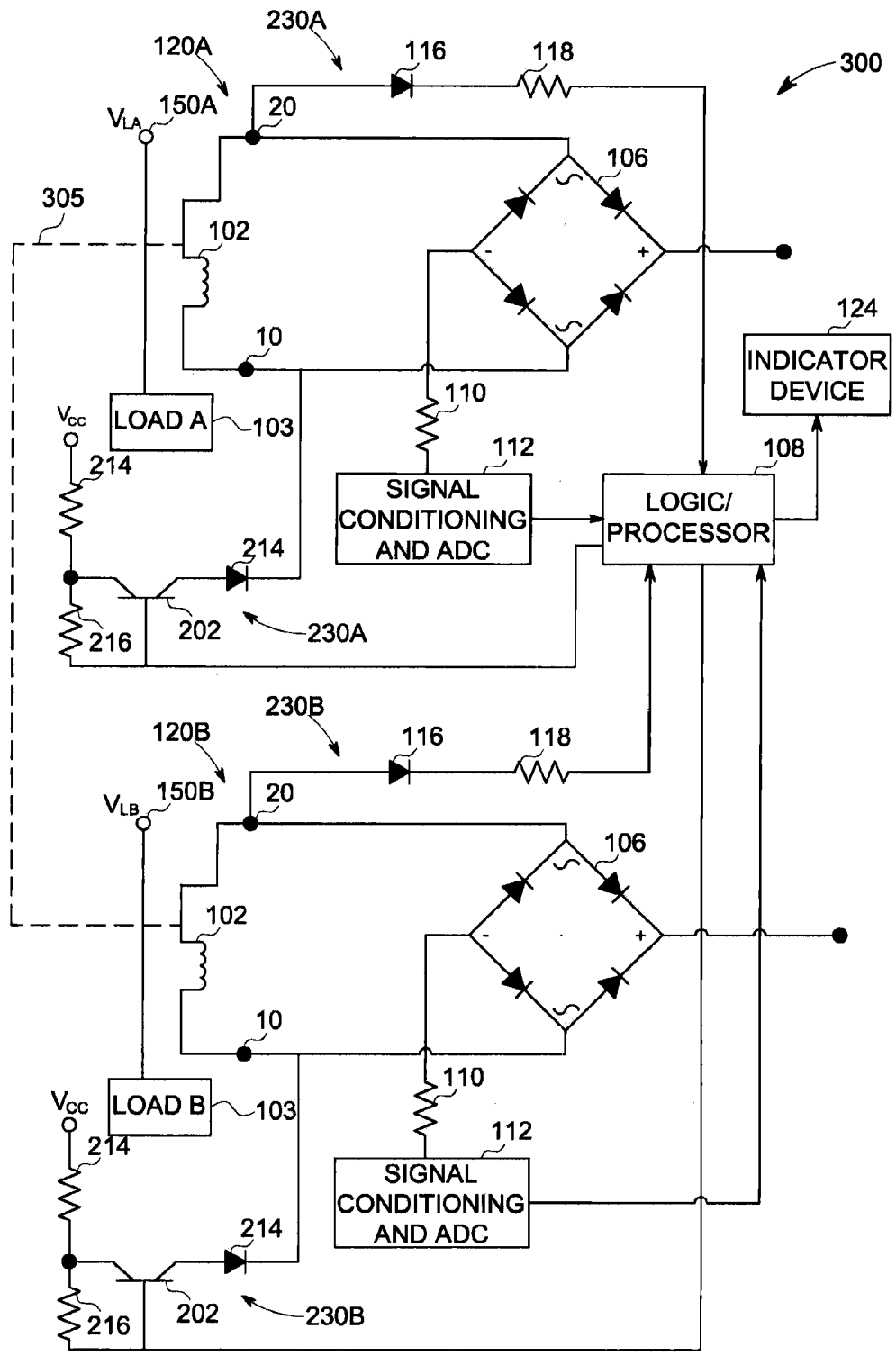
FIG. 3 illustrates an exemplary embodiment of a multiphase circuit protection system.

FIG. 3 illustrates an exemplary embodiment of a multi-phase circuit protection system 300. The illustrated embodiment includes two phases (A and B), however a similar arrangement may be used for any number of phases in a system. For illustrative purposes, the actuator 104 and switching device 105 arrangement is not shown, however actuators 104 and switching devices 105 may be included in the embodiment. The system 300 includes a current sensing portion 120$a$ having a sensing device 102 arranged proximate to a voltage source $V_{LA}$ 150$a$ and a current sensing portion 120$b$ having a sensing device 102 arranged proximate to a voltage source $V_{LB}$ 150$b$. CPVs 230$a$ and 230$b$ are arranged in a similar manner as discussed above in FIG. 2. A processor 108 is connected to the current sensing portions 120$a$ and 120$b$ and the CPVs 230$a$ and 230$b$. The illustrated arrangement allows the processor 108 to determine whether a short 305 exists between the sensing devices 102. In exemplary operation, the processor may initiate a connectivity test by activating the device 202 of CPV 230$a$ (while the device 202 of CPV 230$b$ remains inactive). If the short 305 is present, the signal from CPV 230$a$ will propagate through the short 305 and be detected at the node 20$b$ by the processor 108. Thus, the processor 108 may detect and identify shorts between phases A and B by activating and deactivating the CPVs 230 of each phase in sequence.

Figure 4:
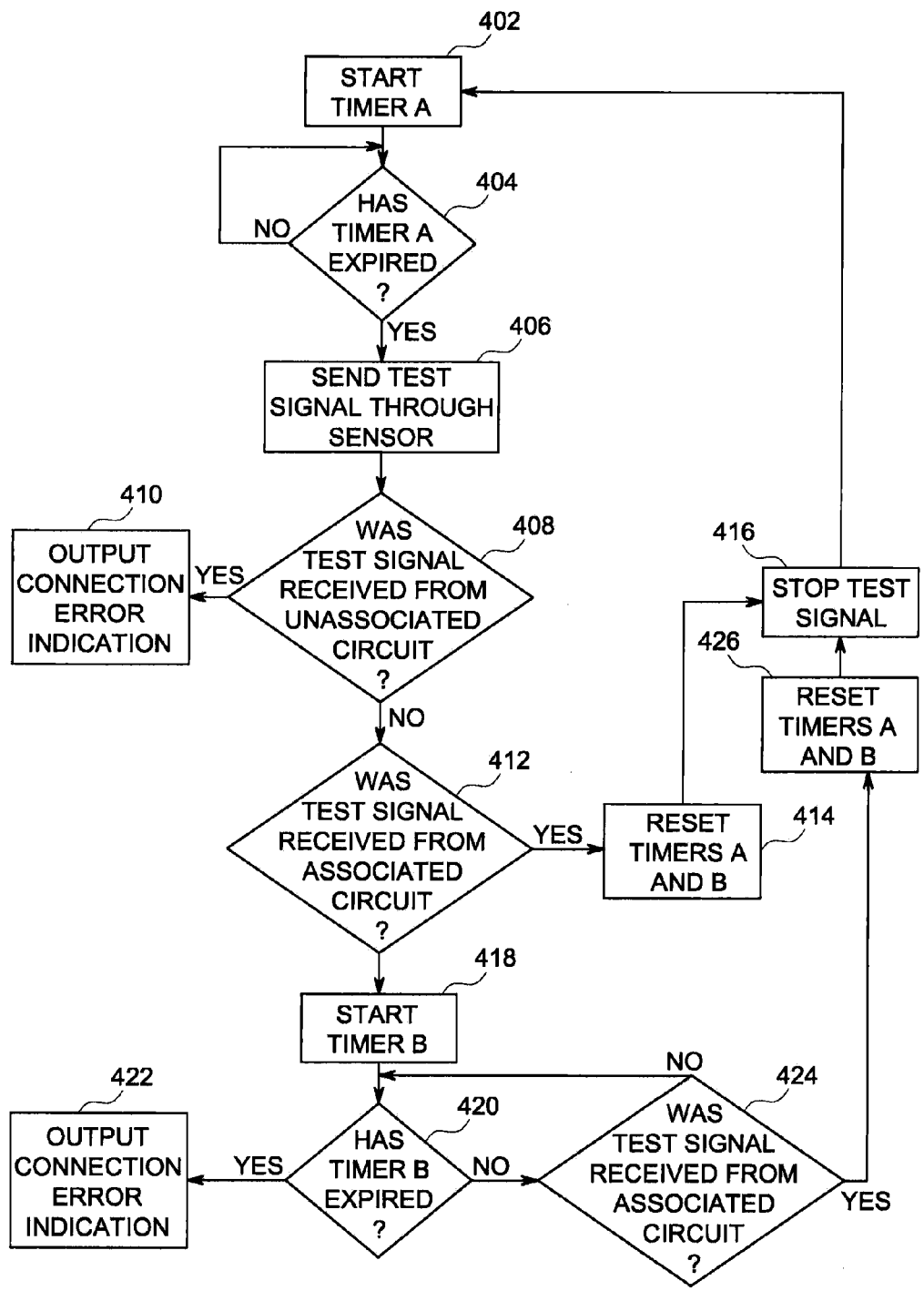
FIG. 4 illustrates a block diagram that includes an exemplary method for operating a circuit protection system.

FIG. 4 illustrates a block diagram that includes an exemplary method for operating the systems described above. In this regard, in block 402 a timer A (located in the processor 108) is started. If the timer A has expired in block 404, a test signal is sent through a sensor in block 406. For example, the processor 108 may activate the device 202 of the CPV 230$a$ (of FIG. 3). In block 408, the processor 108 determines whether the test signal was received from an unassociated circuit in block (e.g., the test signal was sensed as passing through a portion of the CPV 230$b$) if yes, a short may be present, and an error indication is output in block 410. In block 412, the processor 108 determines whether the signal was received from the associated CPV 230$a$ circuit. If yes, the timers A and B are reset in block 414, the device 202 of the CPV 230$a$ may be deactivated, ceasing the test signal in block 416, and the timer A is started in block 402. If the test signal was not received from the associated circuit in block 412, a timer B (located in the processor 108) may be started in block 418. Block 420 determines whether the timer B has expired. If yes, a connection error indication is output in block 422. If no, block 424 determines whether a test signal was received from the associated circuit if yes, the timers A and B are reset in block 426 and the test signal is stopped in block 416. The timer B may be used to delay the output of the connection error in block 422. The threshold for the timer expiration may be set to any value including zero to set a desired delay time. The connection error indication output in block 422 may include any suitable indication including for example, textual or non-textual indicators on a display, a visual indicator such as a light, or a non-visual indicator such as a audible signal or alarm. The receipt of an error indication may also be used to logically open the breaker or switching device 105 (of FIG. 2) if desired.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A circuit protection system comprising:
   a logic portion;
   a current sensing device having a first node and a second node;
   a current sensing circuit connected to the first node and the second node, the current sensing circuit operative to output a voltage indicative of a current sensed by the current sensing device to the logic portion; and
   a connection verification portion connected to the first node, the second node, and the logic portion, the connection verification portion operative to induce a current through the current sensing device.

2. The system of claim 1, wherein the connection verification portion further includes a second diode connected to the second node and a second resistor connected to the second diode and communicatively connected to the logic portion.

3. The system of claim 2, wherein the connection verification portion includes:
   a voltage source connected to a first resistor; and
   a first diode connected to the first resistor and the first node.

4. The system of claim 2, wherein the connection verification portion includes a voltage source communicatively connected to a switching device, the switching device communicatively connected to the first node and the logic portion.

5. The system of claim 2, wherein the connection verification portion includes:
   a third resistor connected to a voltage source and a third node;
   a fourth resistor communicatively connected to the third node and the logic portion; and
   a switching device having a source terminal connected to the third node, a gate terminal connected to the logic portion, and a drain terminal connected to a fourth diode, the fourth diode connected to the first node.

6. The system of claim 2, wherein the connection verification portion includes:
   a third resistor connected to a voltage source and a third node;
   a fourth resistor communicatively connected to the third node and the logic portion; and
   a switching device connected to the third node and the fourth diode, a the fourth diode connected to the first node, the switching device operative to open and close responsive to receiving a signal from the logic portion.

7. The system of claim 1, wherein the current sensing circuit includes:
   a bridge rectifier portion connected to the first node and the second node;
   a signal conditioning portion connected to the bridge rectifier portion; and
   an analog to digital converter portion connected to the signal conditioning portion.

8. The system of claim 1, wherein the logic portion is communicatively connected to an indicator device, the logic portion operative to output an indication to a user responsive to determining that the current sensing device is not connected between the first node and the second node.

9. The system of claim 1, wherein the system further includes:
- a second current sensing device having a fourth node and a fifth node;
- a second current sensing circuit connected to the fourth node and the fifth node, the current sensing circuit operative to output a voltage indicative of a current sensed by the second current sensing device to the logic portion; and
- a second connection verification portion connected to the fourth node, the fifth node, and the logic portion, the second connection verification portion operative to induce a current through the second current sensing device.

10. The system of claim 1, wherein the current sensing device includes a transformer device.

11. The system of claim 1, wherein the current sensing device includes a Rogowski coil device.

* * * * *

UNITED STATES PATENT AND TRADEMARK OFFICE
CERTIFICATE OF CORRECTION

PATENT NO.           : 8,547,106 B2                                             Page 1 of 1
APPLICATION NO.      : 12/981653
DATED                : October 1, 2013
INVENTOR(S)          : Williams It is certified that error appears in the above-identified patent and that said Letters Patent is hereby corrected as shown below:

In the Specification

In Column 3, Line 17, delete "CPVs" and insert -- CVPs --, therefor.

In Column 3, Line 20, delete "CPVs" and insert -- CVPs --, therefor.

In Column 3, Line 24, delete "of CPV 230a (while the device 202 of CPV" and insert -- of CVP 230a (while the device 202 of CVP --, therefor.

In Column 3, Line 26, delete "CPV" and insert -- CVP --, therefor.

In Column 3, Line 29, delete "CPVs" and insert -- CVPs --, therefor.

In Column 3, Line 36, delete "CPV" and insert -- CVP --, therefor.

In Column 3, Line 40, delete "CPV" and insert -- CVP --, therefor.

In Column 3, Line 43, delete "CPV" and insert -- CVP --, therefor.

In Column 3, Line 45, delete "CPV" and insert -- CVP --, therefor.

In the Claims

In Column 4, Line 52, in Claim 6, delete "a the fourth" and insert -- the fourth --, therefor.

Signed and Sealed this
Twenty-fifth Day of March, 2014

Michelle K. Lee
*Deputy Director of the United States Patent and Trademark Office*